(12) United States Patent
Linke et al.

(10) Patent No.: US 7,845,305 B2
(45) Date of Patent: Dec. 7, 2010

(54) TEMPERATURE-INDICATING ELEMENT FOR A REFRIGERATION DEVICE

(75) Inventors: Christine Linke, Gundelfingen (DE); Bernd Pfister, Ulm (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 136 days.

(21) Appl. No.: 10/540,280

(22) PCT Filed: Dec. 15, 2003

(86) PCT No.: PCT/EP03/14259

§ 371 (c)(1),
(2), (4) Date: Jan. 10, 2006

(87) PCT Pub. No.: WO2004/059272

PCT Pub. Date: Jul. 15, 2004

(65) Prior Publication Data

US 2006/0130733 A1    Jun. 22, 2006

(30) Foreign Application Priority Data

Dec. 23, 2002   (DE) .......................... 202 19 911 U

(51) Int. Cl.
*G01K 11/12* (2006.01)
(52) U.S. Cl. ...................... 116/216; 374/162
(58) Field of Classification Search ............... 116/207, 116/216, 217, 218, 219; 374/106, 159, 161, 374/162; D10/57, 58
See application file for complete search history.

(56) References Cited

U.S. PATENT DOCUMENTS

| | | | | |
|---|---|---|---|---|
| 3,465,590 A | * | 9/1969 | Thompson et al. | 374/160 |
| 3,580,079 A | * | 5/1971 | Crites et al. | 374/160 |
| 3,631,720 A | * | 1/1972 | Weinstein et al. | 374/106 |
| 3,895,523 A | * | 7/1975 | Nollen | 374/162 |
| D241,236 S | * | 8/1976 | Van Kersen | D10/57 |
| 4,030,482 A | * | 6/1977 | Navato | 374/162 |
| 4,081,999 A | * | 4/1978 | Lenken | 374/106 |
| 4,161,557 A | * | 7/1979 | Suzuki et al. | 428/1.61 |
| 4,353,990 A | * | 10/1982 | Manske et al. | 435/287.4 |
| 4,509,533 A | * | 4/1985 | Chervitz | 600/549 |
| 4,738,549 A | * | 4/1988 | Plimpton | 374/208 |
| 4,753,406 A | | 6/1988 | Kodama et al. | |
| 4,779,995 A | * | 10/1988 | Santacaterina et al. | 374/162 |
| 4,859,360 A | * | 8/1989 | Suzuki et al. | 252/299.7 |
| 5,072,540 A | * | 12/1991 | Monzyk et al. | 43/4 |
| 5,129,731 A | * | 7/1992 | Ballin | 374/106 |

(Continued)

FOREIGN PATENT DOCUMENTS

DE    2751179 A1  *  5/1978

(Continued)

OTHER PUBLICATIONS

International Search Report for PCT/EP2003/014259.

*Primary Examiner*—R. A. Smith
(74) *Attorney, Agent, or Firm*—James E. Howard; Andre Pallapies

(57) ABSTRACT

A temperature-indicating element for a refrigeration device, including a support or backing, a thermochromic layer applied to the backing for indicating the temperature is suitable for items stored in the location of the element. A transparent potting compound encompasses and protects the thermochromic layer on the backing.

12 Claims, 1 Drawing Sheet

U.S. PATENT DOCUMENTS

Figure 1:
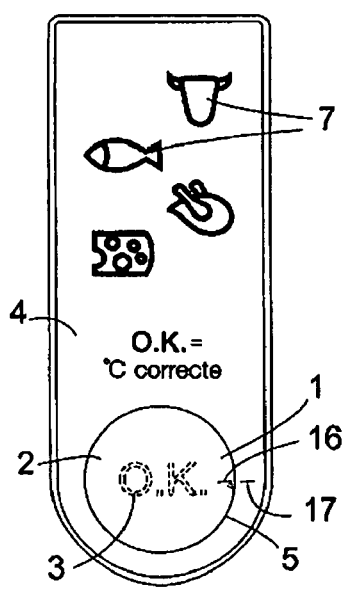

| | | | |
|---|---|---|---|
| 5,202,677 A * | 4/1993 | Parker et al. | 349/21 |
| 5,254,473 A * | 10/1993 | Patel | 436/1 |
| 5,429,393 A * | 7/1995 | Parlo | 283/75 |
| 5,695,284 A * | 12/1997 | Waters | 374/162 |
| 5,709,472 A * | 1/1998 | Prusik et al. | 374/106 |
| 5,788,375 A * | 8/1998 | Parker et al. | 374/162 |
| 5,996,357 A * | 12/1999 | Park | 62/125 |
| 6,241,386 B1 * | 6/2001 | Limburg et al. | 374/162 |
| 6,335,200 B1 * | 1/2002 | Tiru et al. | 436/7 |
| 6,385,860 B1 * | 5/2002 | MacWilliams et al. | 33/613 |
| D477,541 S * | 7/2003 | Barker | D10/57 |
| D478,822 S * | 8/2003 | Kaiser et al. | D10/57 |
| 6,694,913 B2 * | 2/2004 | Cooperman | 116/216 |
| 7,258,073 B2 * | 8/2007 | McGuire | 116/216 |
| 2001/0046451 A1 * | 11/2001 | Patel | 422/58 |
| 2002/0149003 A1 * | 10/2002 | Lucht et al. | 252/408.1 |
| 2007/0119364 A1 * | 5/2007 | Taylor et al. | 116/216 |
| 2008/0041298 A1 * | 2/2008 | Lin | 116/216 |
| 2009/0033188 A1 * | 2/2009 | Becke et al. | 312/404 |

FOREIGN PATENT DOCUMENTS

| | | |
|---|---|---|
| DE | 10045897 A1 * | 3/2002 |
| FR | 2544847 A1 * | 10/1984 |
| FR | 2873431 A1 * | 1/2006 |
| GB | 2199981 A * | 7/1988 |
| GB | 2226403 A * | 6/1990 |
| GB | 2318870 A * | 5/1998 |
| WO | WO 01/46661 | 6/2001 |
| WO | WO 01/84223 | 11/2001 |

* cited by examiner

TEMPERATURE-INDICATING ELEMENT FOR A REFRIGERATION DEVICE

The present invention relates to a temperature-indicating element for a refrigeration device which is provided to be mounted in the interior of a refrigeration device and to allow the user a quick evaluation of whether or not the temperature prevailing at the site of the display element is suitable for storage of certain foodstuffs or not.

At the same thermostat setting, the temperatures in the interior of a refrigerator may vary by several degrees Celsius between the different compartments and even within one compartment, there may be a definite temperature gradient between the rear wall, which is where the evaporator is usually mounted, and the door, the gasket of which is usually the weakest point in the thermal insulation of the refrigerator. For highly perishable foods such as fresh meat, poultry and fish or certain cheeses, storage temperatures that are sometimes definitely below the values considered favorable for other refrigerated goods are desired. To prevent contamination of such highly perishable foods by *Listeria* in particular, storage temperatures of no more than 4° C. should be maintained.

To make it possible for a user to rapidly ascertain whether such sufficiently low temperatures are reached in a certain area of a refrigerator, it is known that such an area may be equipped with a temperature display element. Since a quantitative temperature measurement is not necessary but instead only qualitative information about whether or not the temperature is below the limit temperature of +4° C. is needed, so this information should be rapidly and unambiguously discernible, thermochromic pigments are therefore frequently used for such temperature-indicating elements, i.e., pigments which undergo a reversible change in color as a function of temperature. Such a pigment may be applied to or embedded in a film, for example, the film being applied to a backing or support, which in turn imparts mechanical stability to the film and on the other hand acts as thermal ballast, preventing the display from changing too rapidly when temperatures in the refrigerator change due to opening of the door.

To prevent damage to the film when cleaning the refrigerator, it must be provided with a protective sleeve. This may be accomplished, for example, by accommodating the film and the backing in a housing. However, such a housing does not eliminate the risk of the adhesive bond between the film and the backing being damaged in the constantly moist and cold environment of the refrigerator, nor does it prevent the film from having a tendency to become loosened from the backing after prolonged use, so that the ballast effect of the backing is lost and the display becomes unreliable.

The object of the present invention is to provide a permanent temperature display element for a refrigerator that is easy to manufacture.

This object is achieved according to this invention by the fact that a thermochromic layer is enclosed between a backing to which it is applied and a transparent casting compound. This creates a permanent casing for the thermochromic layer which ensures a uniformly good thermal contact between it and the backing element and therefore does not interfere with the visibility of the thermochromic layer.

Since thermochromic pigments, in particular those that change their color in the temperature range of approx. +4° C., which is preferred for this invention, are damaged even at moderately hot temperatures of more than 4° C., a thermoplastic material that cures at room temperature is preferably used as the casting compound.

Polyurethane in particular is suitable as the plastic material for enclosing the thermochromic layer.

To free the casting compound of any air bubbles, it is preferably subjected to a vacuum treatment before curing.

Preferably a metal plate, in particular made of a material such as aluminum which has a good thermal conductivity, is used as the backing. Since the casting compound is responsible at the same time for thermal insulation of the thermochromic layer with respect to the interior of the refrigerator, therefore the thermal capacity of a metal, which is typically low, provides sufficient thermal ballast. Its good thermal conductivity ensures that there will not be any temperature gradient along the surface of the thermochromic layer which could result in irregular pigmentation of the layer and thus an ambiguous reading result.

As additional protection from moisture, the backing may be enclosed between the casting compound and a film. At the same time, such a film may serve as a backing for printed characters or pictograms, providing the user with instructions regarding the use of the temperature-indicating element. If the film is not present, such characters and pictograms may also be printed on the back of the cured casting material.

The temperature-indicating element is expediently also provided with a mark which indicates a preferred orientation for attaching the temperature-indicating element in a refrigeration device to ensure that the temperature-indicating element is mounted in the refrigeration device in such a way that characters or symbols in the thermochromic layer which become visible only when the temperature falls below the limit temperature of approx. +4° C., appear in the proper orientation.

To ensure that the thermochromic layer is used in the proper orientation, the thermochromic layer should also expediently be provided with an orientation mark at the time of the manufacture of the temperature-indicating element.

A complementary orientation mark on the film is advantageous if the thermochromic layer and the film are used together in one mold in production and are cast together with the casting compound.

Figure 2:
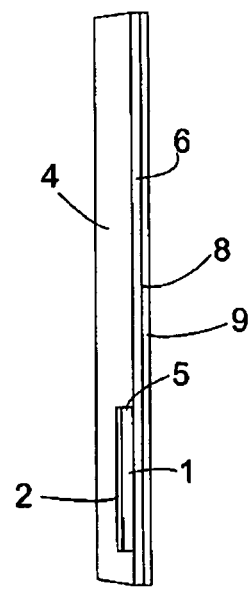

Other features and advantages of this invention are derived from the following description of exemplary embodiments with reference to the accompanying figures, which show:

FIG. 1 a top view of an inventive display element;

FIG. 2 a section through the temperature-indicating element; and

Figure 3:
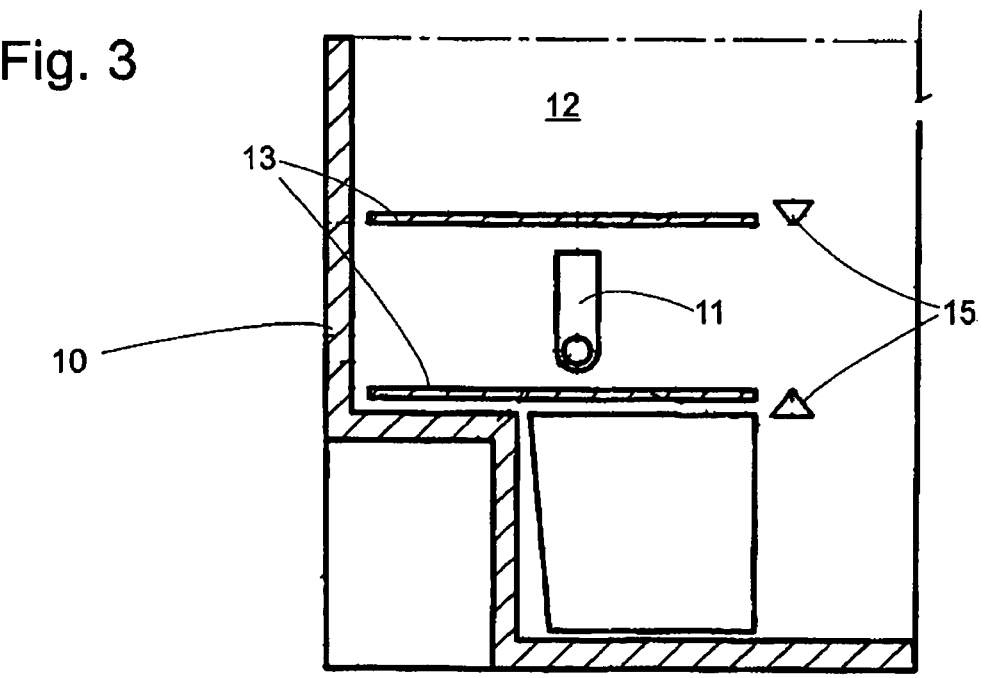

FIG. 3 the mounting of the temperature-indicating element in a refrigeration device.

FIG. 1 shows the inventive temperature-indicating element in a top view and FIG. 2 shows a sectional view, where the section has a larger scale in the direction of the thickness of the element than it does in the longitudinal direction in order to be able to show the layered structure of the element more clearly. A circular aluminum disk 1 serves as the backing for a thermochromic pigmented film 2 or for a pigment applied directly to the disk 1. The pigment is black at temperatures above +4° C. but assumes a greenish-blue color below this temperature threshold. Letters 3 "O.K." printed in ordinary black ink on disk 1 then contrast with the pigment only when the temperature is below 4° C. In other words, when the letters 3 are discernible, the temperature at the location of the element is suitable for storing foods there that are sensitive to Listeria contamination.

To protect the film 2 from moisture from its environment, it is embedded in a transparent casting compound 4. In the exemplary embodiment illustrated here, the casting compound 4 completely surrounds a lateral edge 5 of the aluminum disk 1. This is sufficient for a hermetic enclosure of the film 2. Of course the disk 1 may also be embedded in the casting compound 4 on its back side.

The casting compound 4 is a thermoset plastic material, preferably a polyurethane. It is important for the casting compound 4 to be a castable and curable material at low temperatures because at the present point in time, the known thermochromic pigments have a low stability with respect to elevated temperatures and the thermochromic pigments used in the film 2 are damaged at temperatures above 45° C.

Curing of the casting compound 4 or at least at initial phase of the curing is performed in vacuo to expel any air bubbles present in the still-liquid casting compound before the casting compound sets up.

The back side of the cured casting compound body is laminated to a film 6 on the side of which facing the casting compound 4 have been printed with pictograms 7 representing various types of foods for which storage at temperatures no higher than 4° C. is recommended. On the basis of the orientation of the pictograms 7 or a character printed on the film 6, the user is able to discern intuitively the orientation in which the temperature-indicating element is to be installed. In this orientation, the thermochromic film 2 is close to the lower end of the element, as shown in FIG. 1, which necessarily requires a minimum distance, corresponding to the length of the casting compound body above the aluminum disk 1, between the foil 2 and a compartment in the installation of the element in a refrigeration device. This prevents the element from being installed at a height at which the temperature may differ significantly from that of the remainder of the compartment.

Two line-type orientation marks 16, 17 directed at one another are printed on the thermochromic layer 2 and/or on the film 6. The mark 16 shows the orientation of the letters 3 which are not visible when warm. If the film 6 and the aluminum disk 1 are placed in a mold together with the thermochromic layer 2 when the temperature-indicating element is manufactured, then aligning the two marks 16, 17 with one another ensures that the letters 3 on the finished element will appear in the correct orientation.

A self-stick layer 8 on the back side of the film 6 is protected by a pull-away paper 9 which can be removed easily to attach the temperature-indicating element at the intended location on the inside wall of a refrigeration device.

In contrast with the temperature-indicating element described as an exemplary embodiment here, it is also possible to use a backing element made of an opaque plastic for this purpose. The backing element is then provided with a receptacle that is adapted to the contour of the backing and into which the backing 1 is inserted. In the area outside of the backing 1, the backing element is printed with pictograms 7. The printed backing element and the backing 1 embedded therein are covered here by the transparent casting compound 4.

FIG. 3 shows a schematic partial section through the body 10 of a refrigeration device in which the inventive temperature-indicating element 11 is attached to the inside of a side wall 12. In the depth direction of the refrigeration device, the temperature-indicating element is positioned approximately centrally in a compartment 14 bordered by compartment plates 13. A front edge of the area for which the temperature displayed by the indicator element 11 is representative is indicated by two triangular marks 15 that are embossed, printed or glued onto the side wall 12.

The invention claimed is:

1. A refrigeration device, comprising:
   a temperature-indicating element;
   said temperature-indicating element including a backing comprising a metal plate;
   a thermochromic layer applied to said backing, said thermochromic layer including thermochromic pigment elements that change color at about +4° C. for visually indicating a predetermined desired temperature; and
   said thermochromic layer enclosed between said backing and a transparent protective layer formed from a casting compound.

2. The refrigeration device according to claim 1, wherein said metal plate formed from an aluminum metal plate.

3. The refrigeration device according to claim 1, wherein said metal plate enclosed between said casting compound and a film.

4. The refrigeration device according to claim 1, including a preferred orientation mark for mounting said element in the refrigeration device.

5. The refrigeration device according to claim 4, including said thermochromic layer provided with an orientation mark discernible at room temperature.

6. The refrigeration device according to claim 5, including said film provided with a complementary mark complementary to said orientation mark of said thermochromic layer.

7. The refrigeration device according to claim 1, including a temperature zone in the refrigeration device and said temperature-indicating element located in said temperature zone backing for indicating said predetermined desired temperature in said temperature zone.

8. A temperature-indicating element for a refrigeration device, comprising:
   a backing;
   a thermochromic layer applied to said backing, said thermochromic layer having a pigment of a given color and changing to a pigment of a different color when the refrigeration device passes below a predetermined desired temperature;
   said thermochromic layer enclosed between said backing and a transparent protective layer; and
   an indicator display including a contrast indication element for indicating that the atmosphere within the refrigeration device has passed below said predetermined desired temperature, said contrast indication element being disposed relative to said thermochromic layer such that said contrast indication element visually contrasts with the pigment of the different color and the extent of the visual contrast of said contrast indication element with the pigment of the different color being such that this visual contrast with the pigment of the different color is greater than a visual contrast of said contrast indication element with the pigment of the given color, whereby a user can perceive via the visual contrast of said contrast indication element with the pigment of the different color that the temperature of the refrigeration device has passed below said predetermined desired temperature.

9. The temperature-indicating element for a refrigeration device according to claim 8, wherein the extent of the visual contrast of said contrast indication element with the pigment of the different color is such that said contrast indication element is visually perceptible when the temperature of the refrigeration device has passed below said predetermined desired temperature and the visual contrast of said contrast indication element with the pigment of the given color, which is the respective pigment color of said thermochromic backing when the temperature of the refrigeration device is above said predetermined desired temperature, is so insignificant that said contrast indication element is substantially visually imperceptible.

10. A refrigeration device comprising:

a body defining a refrigeration compartment for refrigerated storage of food items requiring a regulated environment for preservation, the regulated environment being maintained at no greater than the maximum temperature, the refrigeration compartment being delimited by a plurality of interior surfaces and the body having a food item support member in the refrigeration compartment for supporting food items in the regulated environment for maintaining food items at no greater than the maximum temperature; and a temperature indication device disposed within the refrigeration compartment and subdividable into one portion and another portion, the temperature indication device including a temperature sensitive display element disposed in the one portion, the temperature indication device having a display and the temperature indication device being disposed in the refrigeration compartment with the temperature sensitive display element sufficiently proximate to the food item support member that a display characteristic of the display of the temperature sensitive display element varies in correspondence with predetermined temperature changes in a food item supported on the food item support member, and the display of the temperature sensitive display element is operable to display human readable indicia having a display characteristic that varies in correspondence with a predetermined temperature change in a food item supported on the food item support member and the human readable indicia being displayed in the one portion of the temperature indication device in a manner such that human readable indicia is in an upright configuration for proper viewing when the one portion of the temperature indication device is oriented in a predetermined installed orientation within the refrigerator compartment, and the temperature indication device including an asymmetrical set up indicia for visually indicating to a user that the one portion of the temperature indication device is in the predetermined installed orientation, whereupon the human readable indicia is thereby in its upright configuration for proper viewing.

11. The refrigeration device according to claim 10, wherein the temperature sensitive display element disposes the human readable indicia between a non-readable condition in which the human readable indicia is substantially unreadable by a user and a read available condition in which the human readable indicia is readable by a user and the temperature sensitive display element disposing the human readable indicia in a non-readable condition when the temperature is greater than the maximum temperature and disposing the human readable indicia in a read available condition when the temperature is no greater than the maximum temperature.

12. The refrigeration device according to claim 11, wherein the asymmetrical set up indicia is disposed in the other portion of the temperature indication device.

* * * * *